(12) United States Patent  
Dugan et al.

(10) Patent No.: US 6,628,877 B2  
(45) Date of Patent: Sep. 30, 2003

(54) INDEX TRIMMING OF OPTICAL WAVEGUIDE DEVICES USING ULTRASHORT LASER PULSES FOR ARBITRARY CONTROL OF SIGNAL AMPLITUDE, PHASE, AND POLARIZATION

(75) Inventors: Mark A. Dugan, Ann Arbor, MI (US); Robert L. Maynard, Gregory, MI (US); Ali A. Said, Ann Arbor, MI (US)

(73) Assignee: Clark-MXR, Inc., Dexter, MI (US)

( * ) Notice: Subject to any disclaimer, the term of this patent is extended or adjusted under 35 U.S.C. 154(b) by 223 days.

(21) Appl. No.: 09/753,102

(22) Filed: Jan. 2, 2001

(65) Prior Publication Data

US 2002/0085824 A1 Jul. 4, 2002

(51) Int. Cl.$^7$ .................................................. G02B 6/10
(52) U.S. Cl. ........................................ 385/129; 219/121.6
(58) Field of Search ........................... 385/129, 142, 385/144; 219/121.6, 121.69

(56) References Cited

U.S. PATENT DOCUMENTS 5,322,986 A * 6/1994 Nutt ........................ 219/121.6
6,160,944 A * 12/2000 Payne et al. ............... 385/129

\* cited by examiner

Primary Examiner—Akm Enayet Ullah
(74) Attorney, Agent, or Firm—Stephen B. Salai; Donna P. Suchy; Harter, Secrest & Emery LLP

(57) ABSTRACT

Ultrafast pulse beams of light are used to direct-write three-dimensional index profiles in materials using the unique material changing capabilities of ultra-short (i.e. <10 picosecond) laser pulses. An existing waveguide or waveguide circuit fabricated by some technique (for example but not limited to photolithography, flame hydrolysis deposition, modified chemical vapor deposition, or ultrafast laser pulse direct writing) is modified by altering the index of refraction (index trimming) in a localized region or different local regions of the waveguide structure. Index trimming is accomplished through the action of a focused laser beam (or multiple focused beams) consisting of one or more ultra-short laser pulses and is generally performed at a wavelength in which the material is transparent or weakly absorbing, to the fundamental wavelength of the beam of light. The trimmed index pattern is generated by, but not limited to, moving the focal position of the beam or by moving the sample (i.e. waveguide device) relative to a fixed beam focused. Trimming occurs only at or near the focus of the beam. The focus may be a beam waist or a reduced replica of the input beam as might be created by a simple lens or collection of lenses. Or the focus could be where a pattern encoded onto the phase front of the beam is imaged onto or into the sample as, for example, by use of a mask or diffractive optical element (DOE).

17 Claims, 2 Drawing Sheets

INDEX TRIMMING OF OPTICAL WAVEGUIDE DEVICES USING ULTRASHORT LASER PULSES FOR ARBITRARY CONTROL OF SIGNAL AMPLITUDE, PHASE, AND POLARIZATION

BACKGROUND OF THE INVENTION

The insatiable drive for bandwidth in telecommunication systems is forcing component manufacturers to increase channel counts and decrease channel spacing while maintaining uniformity in both loss and polarization sensitivity across many wavelength channels. Furthermore, wavelength selective devices, used for Dense Wavelength Division Multiplexing (DWDM)/Demultiplexing and channel Add/Drop Multiplexing (ADM) to name a few, must maintain strict adherence to an International Telecommunications Union channel wavelength standard, the so-called ITU grid. Increasing channel capacity under rigid industry standards (e.g. Telecordia certification) has greatly compromised manufacturing yields of some of the industries most promising DWDM technology, for example arrayed waveguide gratings (AWG) and Interleavers. These devices operate on the basis of optical interference and consequently even minor changes in their optical properties can degrade performance—or destroy functionality.

In terms of scaleable channel capacity, functional integration, and uniformity, these (so-called) planar waveguide structures offer greater potential for DWDM than devices constructed using thin film filters or fiber (waveguide) Bragg gratings structures. Though their potential has been demonstrated in DWDM test beds, manufacturing yields are marginal at best, which make them very expensive. These devices are lithographically fabricated chips of silicon on isolator (SOI) or silica on silicon (SOS) planar waveguide structures. They separate or combine different channels based on interference of signals after propagating down two or more waveguides with a well-defined difference is length. The wavelength or channel position and the adjacent channel separation, as reflected in the devices transfer function, is a sensitive measure of the differential phase acquired by the signal propagating in the different waveguides. Such length or phase difference can also be induced by a difference in the index of refraction between waveguides—making the transfer function temperature dependent. Since these devices must function reliably in various field conditions, temperature control is needed to stabilize the environment and not relax manufacturing tolerances. Therefore the need exists for the ability to change the index of refraction and/or the index profile on these chips in a spatially controlled manner during a post processing, quality control stage of the manufacturing process.

Besides phase errors corrupting the transmission response in these interference-based devices, polarization dependent loss (PDL), and/or polarization mode dispersion (PMD), and/or unbalanced channel loss can be the reason behind failure of planar waveguide structures to pass quality control tests. For example, at this stage in device integration, a common component in optical waveguide circuits is a variable optical attenuator (VOA). VOA's either follow a device with a multi-port output (e.g. AWG DeMux) in the optical path or precede a multi-port input device (e.g. Mux). Uniformity over channels in a DWDM or ADM device may be caused by non-uniform gain over the number of transmission channels or channel dependent loss. The latter case most often results from the inability to control losses during fabrication. VOA's are included in these circuits to actively ensure channel uniformity by adjusting signal strength in each channel.

The capability of ultra-short laser pulses to direct-write arbitrary three-dimensional refractive index patterns in transparent materials is very desirable for index trimming of SOI, SOS, or other glass (or polycrystalline) (planar) waveguide structures. Patterned index trimming offers a procedure for correcting fabrication defects that result in phase errors, PDL, PMD, unbalanced loss, and degradations in performance related to how light propagates through these devices. Beneficially, this technique does not require special environmental conditions like clean room facilities or special sample preparation. It is therefore ideal for optimizing performance in a post-fabrication or quality control step designed to optimize device performance and/or correct defect(s) that arise during the manufacturing process.

BRIEF SUMMARY OF THE INVENTION

This invention makes use of ultrafast pulse beams of light to direct-write three-dimensional index profiles in materials using the unique material changing capabilities of ultra-short (i.e. <10 picosecond) laser pulses. The invention for writing waveguides was reported in a previous invention disclosure (ID# 468049, submitted to USPTO Feb. 3, 2000). In this invention, an existing waveguide or waveguide circuit fabricated by some technique (for example but not limited to photolithography, flame hydrolysis deposition, modified chemical vapor deposition, or ultra-fast laser pulse direct writing) is modified by altering the index of refraction in a localized region or different local regions of the waveguide structure. Hereafter the local change of the refractive index (either by shaping the index profile through which light passes or by altering how the index-of-refraction varies as a function of position within the structure) will be referred to as index trimming. A localized region of the waveguide structure may constitute any region from a portion of the cross section of the waveguide to the entire waveguide structure itself. The waveguide structure consists of but is not limited to the core and surrounding cladding regions anywhere within the boundary of the structure itself.

Index trimming is accomplished through the action of a focused laser beam (or multiple focused beams) consisting of one or more ultra-short laser pulses and is generally performed at a wavelength in which the material is transparent or weakly absorbing, to the fundamental wavelength of the beam of light. The trimmed index pattern is generated by, but not limited to, moving the focal position of the beam or by moving the sample (i.e. waveguide device) relative to a fixed beam focused. Trimming occurs only at or near the focus of the beam. The focus may be a beam waist or a reduced replica of the input beam as might be created by a simple lens or collection of lenses. Or the focus could be where a pattern encoded onto the phase front of the beam is imaged onto or into the sample as, for example, by use of a mask or diffractive optical element (DOE). Trimming is intended to include any and all of these options, configurations, and derivative modes of altering the optical properties of a planar waveguide structure.

An example of index trimming of an optical waveguide contained within a planar waveguide structure will be illustrated. The illustration is by no means intended to exhaust the application of index trimming of general planar waveguide structures but rather to illustrate the idea. Those skilled in the art will recognize variations in both method and performance of a device modified with this invention—all of which are intended to be included in the claims. The data obtained from the direct writing of linear waveguides in bulk silica glass using a transverse writing configuration gives rise to an elliptically shape waveguide. This is because the intensity profile in the confocal region is an ellipse with minor and major axis scaled by the beam waist and Rayleigh range. When such a beam is focused inside a waveguide of dimensions larger than the confocal region and scanned along the axis of the waveguide a non-isotropic index change is induced which gives rise to a birefringence. The waveguide is then polarization sensitive. To reduce the birefringence and make the index change more uniform over the waveguides cross-section, the writing beam may be displaced side-to-side and scanned along the axis of the waveguide. Or, alternatively, we might shape the beam profile at the focus in order to shape the waveguide. By choosing sub-waveguide focusing parameters a prescribed polarization sensitivity can be written into or effectively erased from a waveguide structure while inducing an index change over the traversed regions. Also a graded index change is induced by gradually increasing the power of the writing beam while scanning along the waveguide axis. This would allow adiabatic propagation over this region without reflection loss. Conversely, an abrupt index change trimmed into a waveguide can induce reflection loss in a controlled manner for balancing losses between channels. Lastly, it is possible to alter the material structure in such a way that a uniformly index-trimmed, waveguide will possess a polarization dependence. This optical anisotropy arises from a material specific, structural modification dependent on the polarization of the ultrashort light pulses. Thus index trimming uniformly over the entire cross-section of the waveguide with a circularly polarized (or unpolarized) light beam would not induce a polarization dependence that is not originally present.

Our invention will greatly reduce manufacturing cost and increase manufacturing yields of planar waveguide structures like AWG's and Interleavers, or any device that operates on the basis of optical interference. The integration of post-processing and quality control in the manufacturing of planar optical waveguide circuits improves production yields. Femtosecond laser technology is presently suited for applications in production environments. Incorporation of this laser technology with automated motion and imaging control of the sample and parameter control of the laser beam enable the above-mentioned integration.

Besides enhancing and streamlining the manufacturing of existing telecommunication devices, our invention would greatly aid in prototyping new more integrated optical waveguide structures. For example, a general pattern for a waveguide circuit can be laid down with using standard lithographic techniques. The designer can then detail the structure through index trimming while monitoring key transmission points in real time. Trimming may involve the balancing of loss in different channels, adjusting propagation delay, interconnecting different points, adjusting coupling between waveguides, and increasing or decreasing polarization sensitivity at different circuit locales. Taps can be directly written into the structure in the out-of-plane dimension to provide performance monitoring capabilities at various points in the device itself.

Data suggests that the index change induced by focusing energetic ultra-short laser pulses is a threshold phenomenon. Below a particular fluence the material is not changed. Once the threshold fluence is reached, a material modification occurs leading to the onset of change in the index of refraction of the material. This would be the base index change. Increasing the fluence further will increase the index change up to a saturation level. The threshold and saturation fluence is somewhat material dependent. This variation in index change with fluence along with the capability of localizing the index change in bulk transparent materials will enable the writing and subsequent trimming of low insertion loss, fused (or nested) waveguide structure such as tapered-core fused-couplers.

By simply changing the power level of the writing beam from where index change occurs at the focus to where irreversible damage occurs, index trimming can be combined with amplitude modulation (i.e. controlled loss). This can be utilized for example to balance channel loss, create amplitude-grating filters, cut erroneous waveguide connections, or for simply marking the device for inventory and quality control purposes. A waist can be created in the waveguide for generating supercontinuum at desirable locations.

It will be advantageous to trim these planar waveguide structures while monitoring the performance of the device itself. It is then possible to terminate the process when optimum device performance is reached. Thus, for example, we envision the process as starting by coupling light possessing the appropriate intensity, wavelength, bandwidth, bandwidth structure, etc. into the planar waveguide structure and trimming until the desired device performance is reached. Beneficially, this approach allows us to measure and record device performance for quality assurance purposes before shipment.

DETAILED DESCRIPTION OF THE INVENTION

Figure 1:
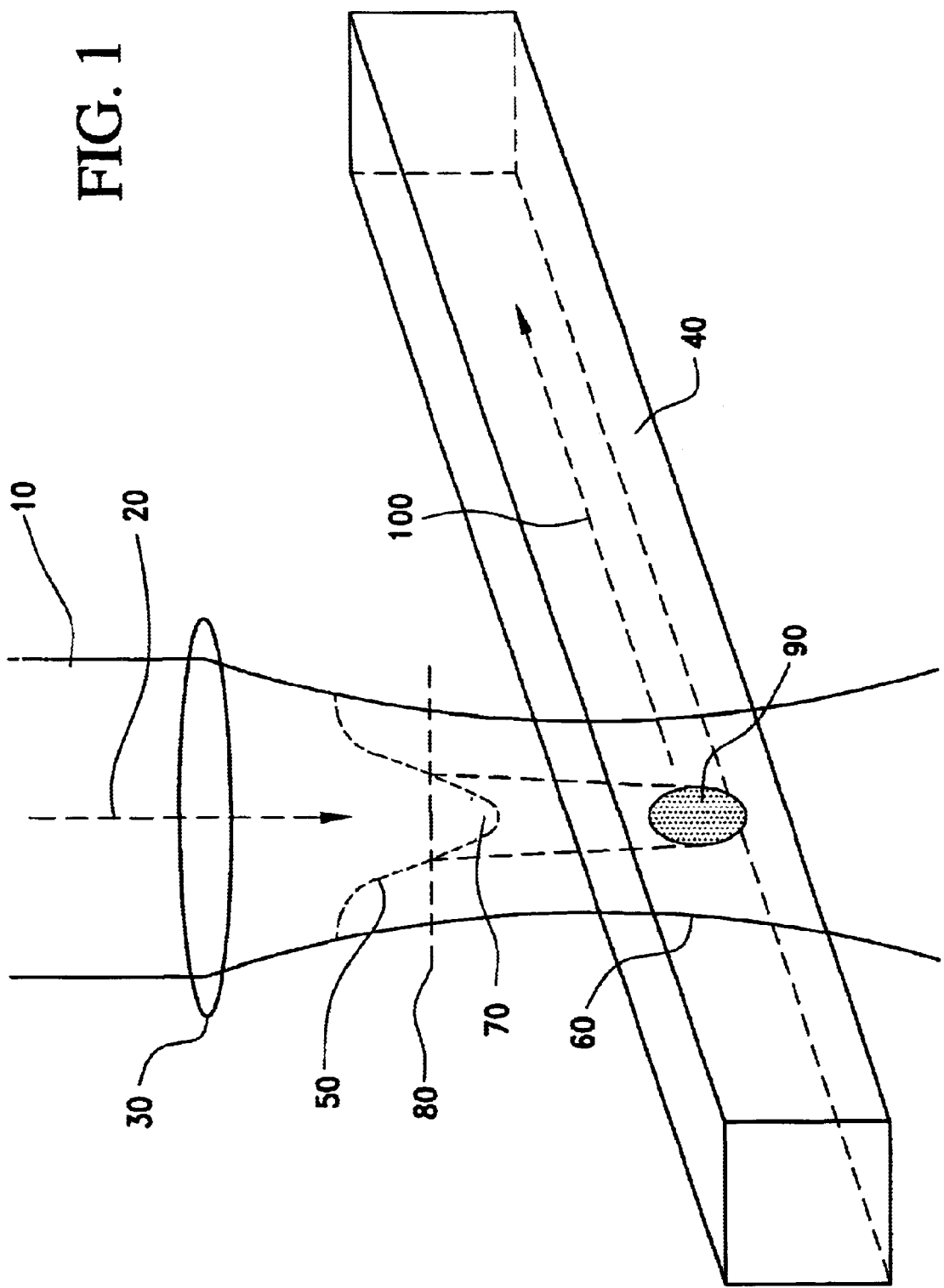
FIG. 1. Is an illustrative view of an ultrashort pulse laser beam being focused into a planar waveguide and creating an index change therein.
Figure 2:
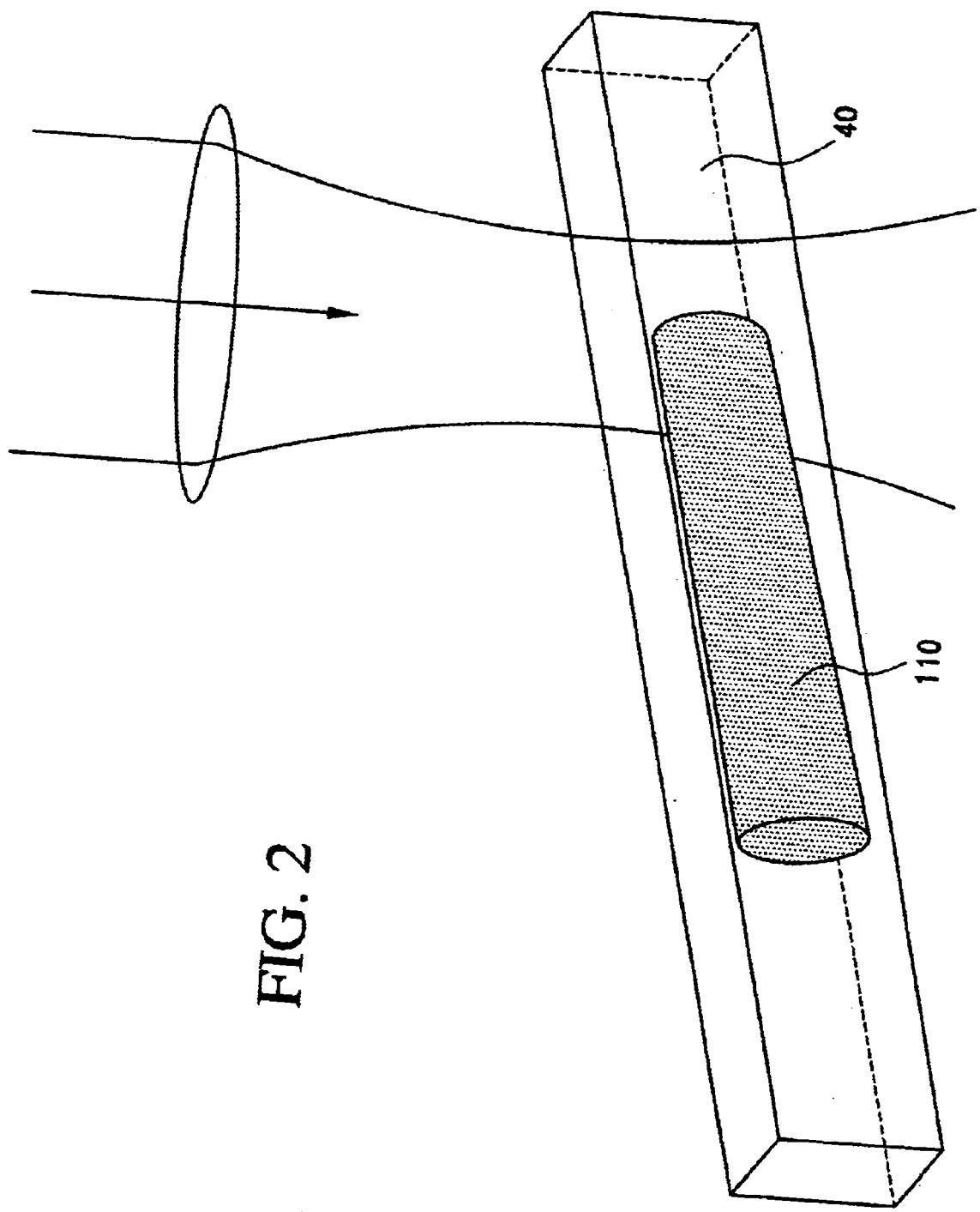
FIG. 2. Is an illustrative view of the change in the index pattern created inside the waveguide by scanning the beam long the axis of the waveguide.

Referring now to FIG. 1, a beam of ultrafast (or ultrashort) pulses of light, 10, propagating in the direction indicated by the arrow 20 is focused by lens 30 into the waveguide 40 embedded in a planar waveguide device (not shown) such as an AWG, Mach Zehnder Interleaver or other (planar) waveguide structure. Generally, these waveguides have an approximately square or rectangular shape as shown in the illustration (the exact shape of the waveguide is not critical to this invention.) The spatial profile of laser beam 10 is arranged to be that of a gaussian $TEM_{00}$ intensity profile as illustrated by the dashed curve 50 and is focused by lens 30 to a waist 60; said waist may or may not be larger than the lateral dimensions of the waveguide 40. The (intensity of) the spatial intensity profile of the beam 10 is arranged so that the portion of the beam 70 below the imaginary line 80 is above the threshold intensity needed to induce a change in the physical structure of the waveguide 40 through multi-photon absorption (here multi-photon absorption is intended to mean the absorption of at least 2 photons of light.) but is not sufficient to alter the physical structure outside the waveguide (at least in this embodiment.) As the beam comes to the focus 60 it induces a change in the physical structure in a portion of the waveguide 40 illustrated by the oval 90. The beam of light 10 is then scanned inside the waveguide 40 illustratively along the direction illustrated by the arrow 100 to create the volume change 110 in the physical structure of the waveguide 40 shown in FIG. 2. This technique is generally applicable to locally altering the physical structure of a waveguide. For example, the intensity of the light beam, its spatial profile, the direction in which it is scanned, and rastering more than one scan either on top of each other, or beside each other, can produce different effects on light propagating through the waveguide. For example:

a.) Multiple scans overlapping each other within the waveguide can result in a larger induced change in the index of refraction of in the waveguide, and consequently larger change in the phase of light propagating through the waveguide.

b.) Varying the intensity of the light beam can result in cylindrical regions of index change that have an oval-shaped cross section with a major and minor axis that alters the polarization of light propagating through it. Thus it is possible to alter the planar structure's polarization behavior.

c.) Multiple scans of a light beam that creates an oval-shaped regions slightly displaced from each other along the minor lateral axis can be used to create approximately symmetric regions of index change that are unpolarized.

d.) The intensity of the light beam as it is scanned along the waveguide, or the rate at which the beam is scanned along the waveguide can be used to created periodic (or a periodic) regions with varying index or "scolloped" sides that act like DFB's or Bragg gratings (both unchirped and chirped.) that are wavelength dependent.

e.) The intensity and focal spot size of the light beam can be adjusted so that the size of the physical structure of the material extends into the cladding. This would be useful, for example, when the waveguide reaches the side of the structure where it is to be attached to fiber to connect with the outside world. By providing a smooth transition between a rectangular waveguide mode and a circular waveguide, it will be possible to reduce coupling losses between these planar waveguide structures and cylindrically shaped fibers.

f.) By writing a change in the index of refraction of the cladding near a waveguide inside a planar waveguide structure it is possible to construct a tap that brings part of the light propagating inside the waveguide out to the surface. This tapped light can then be used to monitor the performance of light propagating inside the waveguide. The amount of light coupled out of the waveguide through the tap can be adjusted by controlling the separation between the tap and the waveguide itself.

These are but a few of the ways in which changing the physical structure of a material by an ultrafast beam of light can be used to improve the performance of planar optical waveguide devices. Those skilled in the art will recognize other beneficial applications of this technology in improving the performance and manufacturing yield of these planar structures.

We claim:

1. A method of altering the performance of a waveguide structure with a pulsed laser beam comprising the steps of:

generating a beam of one or more laser pulses having a sufficiently short pulse width and sufficiently high fluence to directly induce a desired change in the index-of-refraction profile in a localized volume of non-photosensitive material within or near said waveguide structure; and focusing said beam into or near said waveguide structure.

2. The method of claim 1 in which the waveguide structure functions on the basis of optical interference.

3. The method of claim 2 in which the waveguide structure is an Arrayed Waveguide Grating (AWG).

4. The method of claim 2 in which the waveguide structure includes at least one Mach Zehnder waveguide interferometer.

5. The method of claim 1 in which the pulse width and fluence are chosen to induce multiphoton effects at or near the focus of the beam.

6. The method of claim 1 in which the change induces an alteration in the phase, amplitude, or polarization of light propagating within the waveguide structure.

7. The method of claim 1 in which the beam of one or more laser pulses is generated by a mode-locked laser.

8. The method of claim 1 in which the beam of light is selected to have a fundamental wavelength at which at least one of the materials comprising the waveguide structure is transparent or semi-transparent.

9. The method of claim 1 in which the beam of light is selected to have a fundamental wavelength at which all the materials comprising the waveguide structure are transparent or semi-transparent.

10. The method of claim 9 in which the wavelength of the beam of light is chosen to be longer than 1 micron.

11. The method of claim 1 in which the beam of light is scanned in a manner that produces a desired change in performance of the waveguide structure.

12. The method of claim 1 in which one or more of the performance parameters of the beam of light are altered to affect a spatially localized, arbitrarily patterned, refractive index change in a waveguide structure.

13. The method of claim 1 in which altering the performance of a waveguide structure includes enable the writing and subsequent trimming of low insertion loss, fused (or nested) waveguide structure such as tapered-core fused-couplers.

14. The method of claim 1 in which altering the performance of a waveguide structure includes any one or more effects chosen from a group comprising balancing channel loss, creating amplitude-grating filters, cutting erroneous waveguide connections, or marking the device for inventory and quality control purposes.

15. The method of claim 1 comprising the additional step of inputting a second beam of light into the waveguide structure for monitoring its performance during the trimming process.

16. The method of claim 15 comprising the additional step of terminating the trimming process based on the results obtained during the monitoring process.

17. The method of either claim 15 or claim 16 in which performance of the waveguide structure is recorded and stored during and/or after trimming.

* * * * *

UNITED STATES PATENT AND TRADEMARK OFFICE
CERTIFICATE OF CORRECTION

PATENT NO. : 6,628,877 B2
DATED : September 30, 2003
INVENTOR(S) : Dugan, Mark A., Maynard, Robert L. and Said, Ali A.

It is certified that error appears in the above-identified patent and that said Letters Patent is hereby corrected as shown below:

Column 1,
Line 8, please insert:
-- The U.S. Government has a paid-up license in this invention and the right in limted circumstances to require the patent owner to license others on reasonable terms as provided for by the terms of Contract No. F29601-00-C-0049 awarded by the United States Air Force. --

Signed and Sealed this

Twenty-fifth Day of January, 2005

JON W. DUDAS
*Director of the United States Patent and Trademark Office*

UNITED STATES PATENT AND TRADEMARK OFFICE
CERTIFICATE OF CORRECTION

PATENT NO. : 6,628,877 B2
DATED : September 30, 2003
INVENTOR(S) : Dugan, Mark A. Maynard, Robert L. and Said, Ali A.

It is certified that error appears in the above-identified patent and that said Letters Patent is hereby corrected as shown below:

<u>Column 1,</u>
Line 8, please insert -- The U.S. Government has a paid-up license in this invention and the right in limited circumstances to require the patent owner to license others on reasonable terms as provided for by the terms of Contract No. F29601-00-C-0049 awarded by the United States Air Force. --

Signed and Sealed this

Tenth Day of May, 2005

JON W. DUDAS
*Director of the United States Patent and Trademark Office*